United States Patent
Saito et al.

(10) Patent No.: US 10,862,655 B2
(45) Date of Patent: *Dec. 8, 2020

(54) USER TERMINAL AND RADIO COMMUNICATION METHOD

(71) Applicant: NTT DOCOMO, INC., Tokyo (JP)

(72) Inventors: Keisuke Saito, Tokyo (JP); Yousuke Sano, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/091,854

(22) PCT Filed: Apr. 6, 2017

(86) PCT No.: PCT/JP2017/014318
§ 371 (c)(1),
(2) Date: Oct. 5, 2018

(87) PCT Pub. No.: WO2017/175818
PCT Pub. Date: Oct. 12, 2017

(65) Prior Publication Data
US 2019/0089511 A1 Mar. 21, 2019

(30) Foreign Application Priority Data
Apr. 8, 2016 (JP) .................. 2016-078361

(51) Int. Cl.
*H04L 5/00* (2006.01)
*H04W 28/18* (2009.01)
(Continued)

(52) U.S. Cl.
CPC .......... *H04L 5/0057* (2013.01); *H04L 5/0051* (2013.01); *H04W 28/06* (2013.01);
(Continued)

(58) Field of Classification Search
CPC ... H04L 5/0057; H04L 5/0051; H04L 1/0003; H04W 72/1268; H04W 72/042; H04W 28/18; H04W 28/06
See application file for complete search history.

(56) References Cited

U.S. PATENT DOCUMENTS

2010/0195614 A1* 8/2010 Nimbalker ........ H04W 72/1289
370/330
2013/0308504 A1* 11/2013 Nimbalker .............. H04L 5/001
370/281
(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestial Radio Access Network (E-UTRAN); Overall description; Stage 2 (Release 8)"; Mar. 2010 (149 pages).
(Continued)

*Primary Examiner* — Rina C Pancholi
(74) *Attorney, Agent, or Firm* — Osha Bergman Watanabe & Burton LLP

(57) ABSTRACT

The present invention is designed to reduce the impact which the variation of the amount of overhead within a subframe has upon the throughput of data channels. A user terminal, according to the present invention, has a transmitting/receiving section that receives a downlink (DL) signal and/or transmits an uplink (UL) signal in a subframe, and a control section that controls transport block sizes (TBSs) of the DL signal and/or the UL signal. The user terminal controls the TBSs based on overhead in the subframe or a desired coding rate.

9 Claims, 20 Drawing Sheets

(51) Int. Cl.
  *H04W 28/06* (2009.01)
  *H04W 72/04* (2009.01)
  *H04W 72/12* (2009.01)
  *H04L 1/00* (2006.01)

(52) U.S. Cl.
  CPC ......... *H04W 28/18* (2013.01); *H04W 72/042* (2013.01); *H04W 72/1268* (2013.01); *H04L 1/0003* (2013.01)

(56) References Cited

U.S. PATENT DOCUMENTS

2013/0329661 A1  12/2013  Chen et al.
2015/0117396 A1*  4/2015  Wang .................. H04W 72/042
                                                              370/330
2015/0319776 A1*  11/2015  Seo ....................... H04B 7/208
                                                              370/329
2015/0365181 A1  12/2015  Nagata et al.

OTHER PUBLICATIONS

International Search Report issued in PCT/JP2017/014318 dated Jun. 27, 2017 (2 pages).
Written Opinion of the International Searching Authority issued in PCT/JP2017/014318 dated Jun. 27, 2017 (4 pages).
Extended European Search Report issued in counterpart European Patent Application No. 17779196.9, dated Oct. 9, 2019 (8 pages).

* cited by examiner

| CQI INDEX | MODULATION | CODE RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 2

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 3

| $I_{TBS}$ | 1 | 2 | 3 | 4 | 5 | $N_{PRB}$ 6 | 7 | 8 | 9 | 10 |
|---|---|---|---|---|---|---|---|---|---|---|
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

FIG. 4

| TBS_L1 | TBS_L2 | TBS_L1 | TBS_L2 | TBS_L1 | TBS_L2 | TBS_L1 | TBS_L2 |
|---|---|---|---|---|---|---|---|
| 1544 | 3112 | 3752 | 7480 | 10296 | 20616 | 28336 | 57336 |
| 1608 | 3240 | 3880 | 7736 | 10680 | 21384 | 29296 | 59256 |
| 1672 | 3368 | 4008 | 7992 | 11064 | 22152 | 30576 | 61664 |
| 1736 | 3496 | 4136 | 8248 | 11448 | 22920 | 31704 | 63776 |
| 1800 | 3624 | 4264 | 8504 | 11832 | 23688 | 32856 | 66592 |
| 1864 | 3752 | 4392 | 8760 | 12216 | 24496 | 34008 | 68808 |
| 1928 | 3880 | 4584 | 9144 | 12576 | 25456 | 35160 | 71112 |
| 1992 | 4008 | 4776 | 9528 | 12960 | 25456 | 36696 | 73712 |
| 2024 | 4008 | 4968 | 9912 | 13536 | 27376 | 37888 | 76208 |
| 2088 | 4136 | 5160 | 10296 | 14112 | 28336 | 39232 | 78704 |
| 2152 | 4264 | 5352 | 10680 | 14688 | 29296 | 40576 | 81176 |
| 2216 | 4392 | 5544 | 11064 | 15264 | 30576 | 42368 | 84760 |

FIG. 6

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | (696) |
| 5 | 72 | 144 | 224 | 328 | 424 | 504 | 600 | 680 | 776 | (872) |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

| CODING RATE (BEFORE CORRECTION) | R=0.37 | R=0.29 | R=0.32 |
|---|---|---|---|
| | SF#1 Overhead : 30 % | SF#2 Overhead : 10 % | SF#3 Overhead : 20 % |
| CODING RATE (AFTER CORRECTION) | R=0.30 | R=0.29 | R=0.32 |
| $I_{TBS}$ CORRECTION (5→4) (TBS: 872→696) | | WITHOUT CORRECTION | WITHOUT CORRECTION |

FIG. 11

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |

SF#1 — 872 → 600
SF#2 — 872 → 776
SF#3 — 872 → 712

| CODING RATE (BEFORE CORRECTION) | R=0.37 | R=0.29 | R=0.32 |
|---|---|---|---|
| | SF#1 Overhead : 30 % | SF#2 Overhead : 10 % | SF#3 Overhead : 20 % |
| CODING RATE (AFTER CORRECTION) | R=0.26 | R=0.26 | R=0.26 |

(1) OVERHEAD CORRECTION · 872*0.7=610.4
(2) FILLER BIT CORRECTION · 600

(1) OVERHEAD CORRECTION · 872*0.9=784.8
(2) FILLER BIT CORRECTION · 776

(1) OVERHEAD CORRECTION · 872*0.8=697.6
(2) FILLER BIT CORRECTION · 712

| CQI index or MCS index | Target Modulation | Target Code rate |
|---|---|---|
| 0 | QPSK | 0.3 |
| 1 | QPSK | 0.5 |
| 2 | QPSK | 0.7 |
| 3 | 16QAM | 0.3 |
| 4 | 16QAM | 0.5 |
| 5 | 16QAM | 0.7 |
| 6 | 64QAM | 0.3 |
| 7 | 64QAM | 0.5 |
| ... | ... | ... |

FIG. 14B

| | | | | | | |
|---|---|---|---|---|---|---|
| 16 | 136 | 376 | 744 | 1608 | 3112 | 6200 |
| 24 | 144 | 408 | 840 | 1800 | 3240 | 6968 |
| 32 | 176 | 440 | 904 | 1992 | 3624 | 7992 |
| 40 | 208 | 488 | 968 | 2152 | 4008 | 9144 |
| 56 | 224 | 520 | 1064 | 2344 | 4264 | 10296 |
| 72 | 256 | 552 | 1160 | 2472 | 4584 | ... |
| 328 | 280 | 584 | 1288 | 2664 | 4968 | ... |
| 104 | 328 | 616 | 1384 | 2856 | 5352 | ... |

USER TERMINAL AND RADIO COMMUNICATION METHOD

TECHNICAL FIELD

The present invention relates to a user terminal and a radio communication method in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). Also, successor systems of LTE (referred to as, for example, "LTE-A (LTE-Advanced)," "FRA (Future Radio Access)," "4G," "5G," and so on) are under study for the purpose of achieving further broadbandization and increased speed beyond LTE.

In existing LTE systems, adaptive modulation and coding (AMC), in which at least one of the modulation scheme and the coding rate is adjusted adaptively, is used in link adaptation.

In the downlink (DL), at least one of the modulation scheme and the coding rate of DL signals (for example, a DL data channel such as the PDSCH (Physical Downlink Shared Channel)) is adaptively controlled based on a channel quality indicator (for example, CQI (Channel Quality Indicator)) that is fed back from user terminals (for example, UE (User Equipment)).

In the uplink (UL), at least one of the modulation scheme and the coding rate of UL signals (for example, a UL data channel such as the PUSCH (Physical Uplink Shared Channel)) is adaptively controlled based on the received quality (for example, RSRQ (Reference Signal Received Quality)) in a radio base station (for example, eNB (eNodeB)).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing LTE systems, the transport block size (TBS) to apply to DL signals and/or UL signals is uniquely determined depending on the modulation scheme and the number of resource blocks (PRBs: Physical Resource Blocks) that are applied to the DL signals and/or the UL signals. Therefore, the coding rate, when calculated based on the TBS, varies depending on the overhead in a subframe (for example, the amount of signals, including reference signals, L1/L2 control channels, broadcast signals, synchronization signals, and/or other signals).

Now, in LTE Rel. 13 and later radio communication systems (for example, 5G), subframes having no predetermined use (for example, the direction of communication such as DL and/or UL, the type and format of signals such as data, reference signals, etc.) may be used (also referred to as "dynamic subframe utilization" and so on), except for some subframes, considering scalability, power saving performance and so on. In such future radio communication systems, overhead may vary significantly within a subframe, compared to existing LTE systems.

Thus, if the TBS for a DL signal and/or a UL signal is determined using the same method as in existing LTE systems while the overhead varies within a subframe, the coding rate that is calculated based on this TBS might deviate from the desired coding rate, and the received quality of the DL signal and/or the UL signal might become excessive or insufficient, which may have an impact on the throughput of the DL signal and/or the UL signal.

The present invention has been made in view of the above, and it is therefore an object of the present invention to provide a user terminal and a radio communication method, whereby the impact that the variation of overhead within a subframe has on the throughput of DL signals and/or UL signals can be reduced.

Solution to Problem

According to one aspect of the present invention, a user terminal has a transmitting/receiving section that receives a downlink (DL) signal and/or transmits an uplink (UL) signal in a subframe, and a control section that controls transport block sizes (TBSs) of the DL signal and/or the UL signal, and, in this user terminal, the control section controls the TBSs based on overhead in the subframe or a desired coding rate.

Advantageous Effects of Invention

According to the present invention, when overhead varies within a subframe, the impact on the throughput of DL signals and/or UL signals can be reduced.

BRIEF DESCRIPTION OF DRAWINGS

FIG. 2 is a diagram to show an example of a CQI table;
FIG. 3 is a diagram to show an example of an MCS table;
FIG. 4 is a diagram to show an example of a TBS table;
FIG. 6 is a diagram to show an example of a conversion table for TBSs in a plurality of layers;
FIG. 11 is a diagram to show an example of the method for correcting the TBS (first correction method);
FIG. 12 is a diagram to show another example of the method for correcting the TBS (second correction method);
FIGS. 14A and 14B are diagrams to show examples of methods for selecting the TBS;

DESCRIPTION OF EMBODIMENTS

Figure 1:
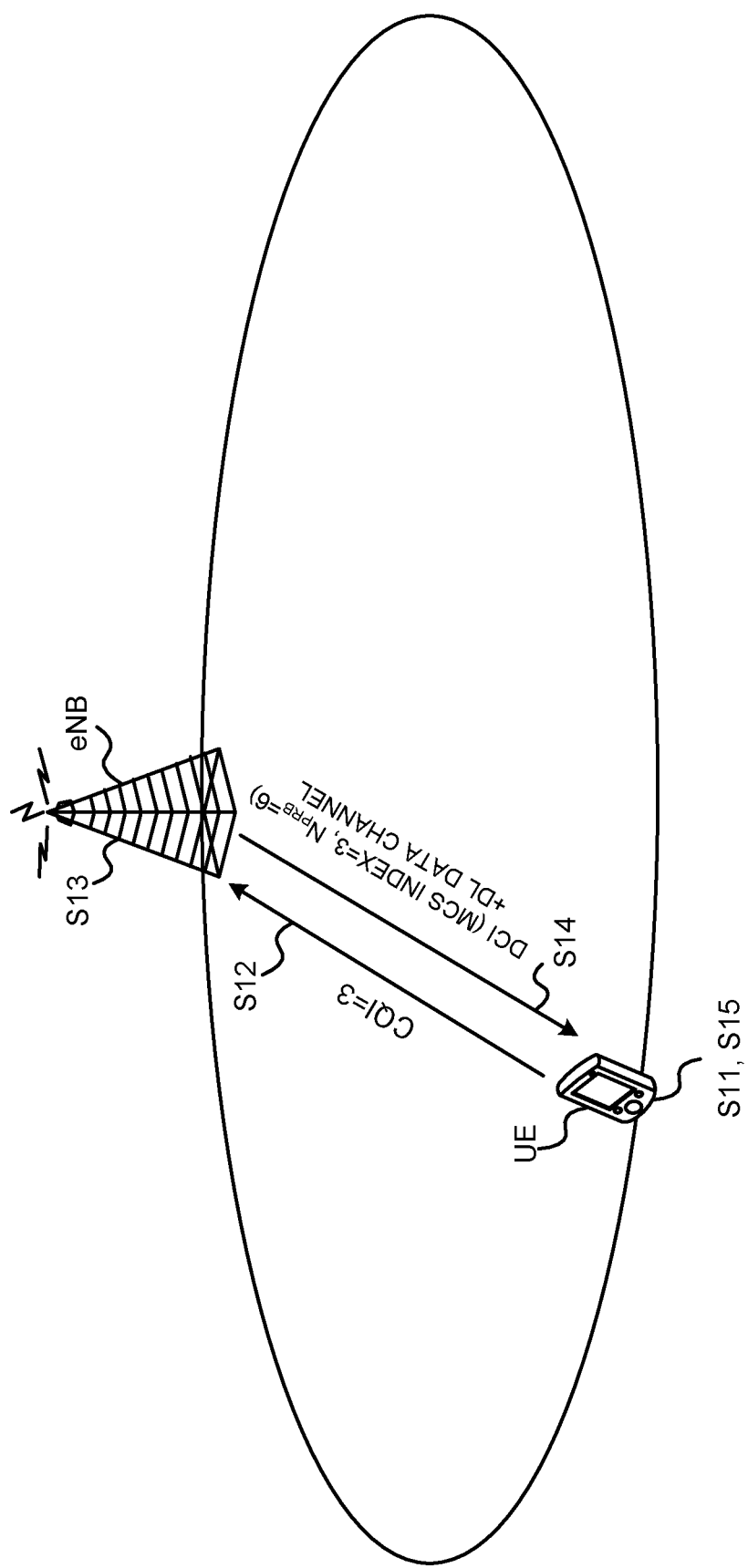
FIG. 1 is a diagram to show an example of determining the TBS for a DL data channel.

Adaptive modulation and coding (AMC) in existing LTE systems will be described with reference to FIG. 1 to FIG. 4. FIG. 1 is a diagram to show an example of determining the TBS for a DL data channel. FIG. 2 is a diagram to show an example of a CQI table. FIG. 3 is a diagram to show an example of an MCS (Modulation and Coding Scheme) table. FIG. 4 is a diagram to show an example of a TBS table.

In the radio communication system shown in FIG. 1, a user terminal (UE) measures the received quality in the DL (for example, RSRP (Reference Signal Received Power)) using reference signals from a radio base station (eNB), and determines the channel quality indicator (CQI) based on this received quality (step S11). To be more specific, the user terminal looks up the CQI table shown in FIG. 2, and selects a CQI that represents a modulation scheme and a coding rate that enable demodulation under the environment of the measured receiving quality.

As shown in FIG. 2, in the CQI table, channel quality indicators (CQIs), modulation schemes, and coding rates are associated. For example, in FIG. 2, sixteen kinds of combinations of modulation schemes and coding rates are defined according to CQIs. Therefore, in FIG. 2, these sixteen kinds of combinations can be identified uniquely by providing four-bit CQIs. Note that, in the CQI table, the value of a CQI may be referred to as a "CQI index."

The user terminal feeds back the CQI, which has been selected with reference to the CQI table shown in FIG. 2, to the radio base station (step S12). For example, in FIG. 1, the CQI "3" is fed back from the user terminal to the radio base station. Note that the CQI is fed back using a UL control channel (for example, PUCCH: Physical Uplink Control Channel) and/or a UL data channel.

The radio base station determines the MCS index and the TBS of the DL data channel based on the CQI fed back from the user terminal (step S13). To be more specific, the radio base station, taking into consideration the quality which the CQI fulfills, the effect of outer loop control and so on, selects an MCS index from the MCS table shown in FIG. 3, and acquires the modulation order and the TBS index that are associated with the MCS index.

Also, looking up the TBS table shown in FIG. 4, the radio base station selects the TBS that is associated with the TBS index acquired from the MCS table and the number of resource blocks (PRBs) allocated to the DL data channel (hereinafter referred to as "the number of allocated PRBs," "$N_{PRB}$," and so on). The radio base station performs the coding process (including rate matching) of the DL data channel based on the acquired TBS.

For example, when the CQI "3" is fed back from the user terminal as shown in FIG. 1, the radio base station selects an arbitrary MCS index (for example, "3") from the MCS table shown in FIG. 3, and acquires the modulation order "2" and the TBS index "3" associated with that MCS index. From the TBS table shown in FIG. 4, the radio base station acquires the TBS "328" that is associated with the TBS index "3" and the number of PRBs allocated to the DL data channel "6." The radio base station performs the signal transmission process such as encoding based on the acquired TBS "328."

The radio base station transmits the downlink control information (DCI) (for example, DL assignment) that includes the determined MCS index and the number of PRBs allocated to the DL data channel, and the DL data channel having been subjected to the coding process as described above, to the user terminal (step S14).

The user terminal acquires the modulation scheme and the TBS for the DL data channel based on the MCS index reported from the radio base station (step S15). To be more specific, the user terminal looks up the MCS table shown in FIG. 3, and acquires the modulation order and the TBS index associated with the MCS index. The user terminal demodulates the DL data channel using the modulation scheme that is associated with the acquired modulation order.

Also, the user terminal looks up the TBS table shown in FIG. 4, and acquires the TBS that is associated with the acquired TBS index and the number of PRBs allocated to the DL data channel. The user terminal performs the decoding process of the DL data channel using the acquired TBS.

Figure 5:
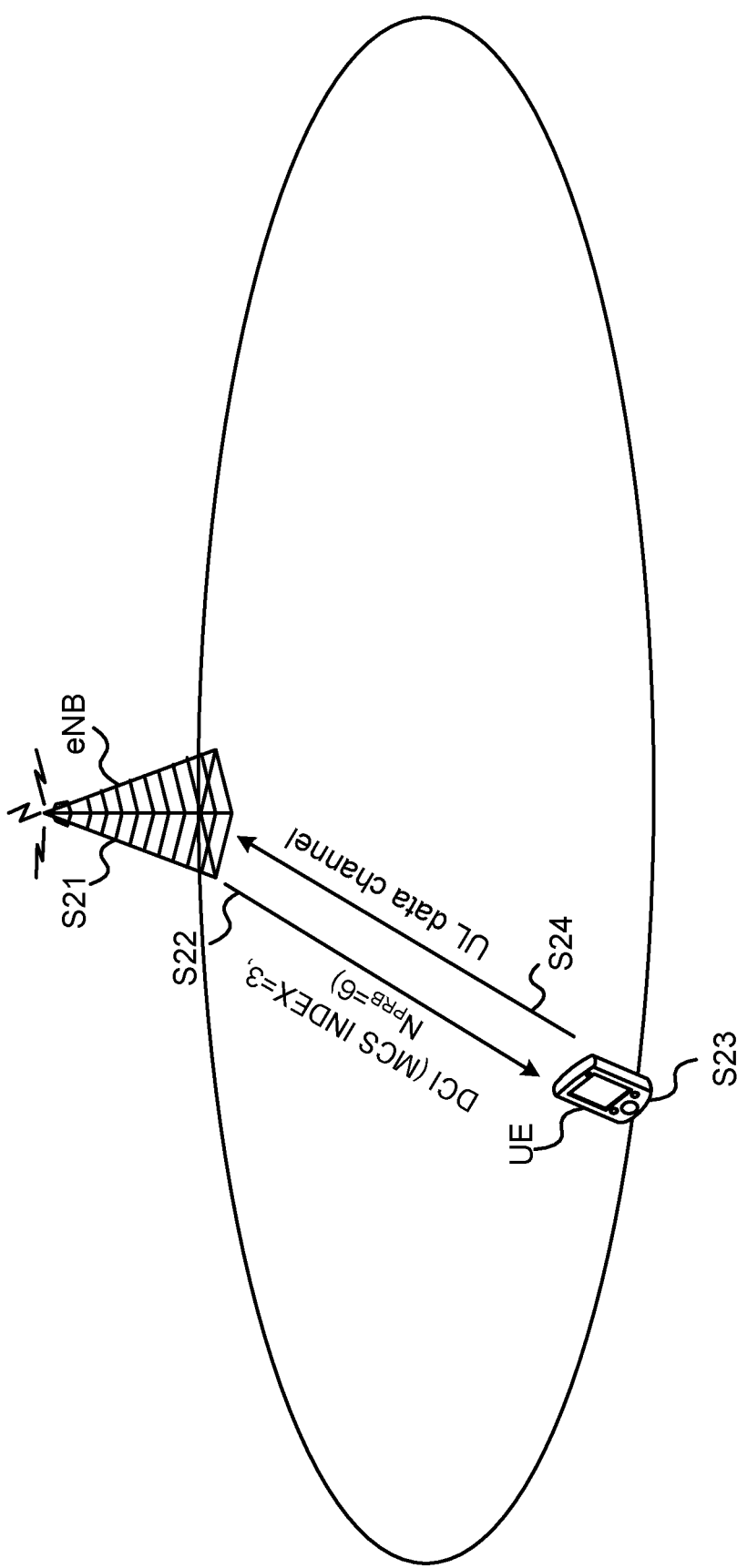
FIG. 5 is a diagram to show an example of determining the TBS for a UL data channel.

FIG. 5 is a diagram to show an example of determining the TBS for a UL data channel. As shown in FIG. 5, the radio base station determines the MCS index to apply to a UL data channel and the number of PRBs to allocate, based on the received quality in the UL, and/or the like (step S21). The radio base station transmits DCI (for example, UL grant), which includes the determined MCS index and the number of PRBs allocate to the UL data channel, to the user terminal (step S22).

The user terminal acquires the modulation scheme and the TBS for the UL data channel based on the MCS index reported from the radio base station (step S23). To be more specific, the user terminal looks up the MCS table shown in FIG. 3, and acquires the modulation order and the TBS index associated with the MCS index. The user terminal modulates the UL data channel using the modulation scheme that is associated with the acquired modulation order.

Also, the user terminal looks up the TBS table shown in FIG. 4, and acquires the TBS that is associated with the acquired TBS index and the number of PRBs to allocate to the UL data channel. The user terminal performs the coding process (for example, rate matching) of the UL data channel using the acquired TBS. The user terminal transmits the UL data channel modulated and encoded as described above, to the radio base station (step S24).

The TBS, determined as described above, is assumed to be transmitted in one layer of a DL data channel and/or a UL data channel (hereinafter referred to as "DL/UL data channel"). When a DL/UL data channel is transmitted in a plurality of layers, the TBS determined as described above is converted according to the number of layers.

FIG. 6 is a diagram to show an example of a TBS conversion table for use in multi-layer transmission. As shown in FIG. 6, the TBS when a DL/UL data channel is transmitted in one layer and the TBS when a DL/UL data channel is transmitted in two layers are associated with each other. For example, if the TBS determined in the above-described fashion is "1928," when the DL/UL data channel is transmitted in two layers, the TBS is converted to "3880."

As described above, the TBS in existing LTE systems is determined uniquely based on an MCS index and the number of PRBs to allocate to a DL/UL data channel, which are selected in a radio base station. Therefore, the coding rate of a DL/UL data channel varies depending on the overhead within a subframe (the amount of signals other than DL/UL data channels, such as reference signals, L1/L2 control channels and/or other signals).

Now, in LTE Rel. 13 and later radio communication systems (for example, 5G), subframes having no predetermined use (for example, the direction of communication such as DL and/or UL, the type and format of signals such as data, reference signals, etc.) may be used (also referred to as "dynamic subframe utilization" and so on), except for some subframes, considering scalability, power saving performance and so on. In such future radio communication systems, overhead may vary significantly within a subframe, compared to existing LTE systems.

Figure 7:
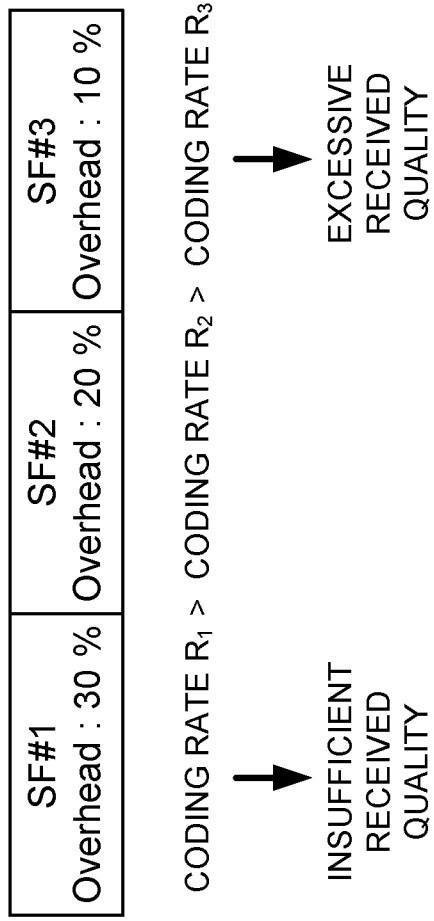
FIG. 7 is a diagram to show the relationships among the number of symbols in a subframe, the coding rate, and the received quality.

FIG. 7 is a diagram to show the relationships among the overhead within a subframe, the coding rate, and the received quality. FIG. 7 shows the relationships among the overhead, the coding rate and the received quality in the event the TBS is determined using the same method as in existing LTE systems.

For example, as shown in FIG. 7, when the proportions of overhead in subframes (SFs) #1, #2 and #3 are 30%, 20% and 10%, respectively, the coding rates $R_1$, $R_2$, and $R_3$ of subframes #1, #2 and #3 increase according to the proportion of overhead. Therefore, even if the TBS, the modulation scheme and the number of PRBs allocated are the same, depending on the proportion of overhead, the received quality may be insufficient as in subframe #1, or the received quality may be excessive as in subframe #3.

Thus, if the TBS for a DL signal and/or a UL signal (for example, a DL/UL data channel) is determined using the same method as in existing LTE systems while overhead varies within a subframe, the coding rate that is calculated based on this TBS might deviate from the desired coding rate, and the received quality of the DL signal and/or the UL signal might become excessive or insufficient, which may have an impact on the throughput of these data channels.

Therefore, the present inventors have focused on the point that the coding rate varies depending on the overhead in subframes and the TBS, and come up with the idea of controlling the TBS of a DL and/or a UL signal (for example, a DL/UL data channel) by taking into account the overhead in subframes. As one aspect of the present embodiment, the present inventors have arrived at controlling the TBS so that the coding rate does not vary significantly depending on the overhead in subframes—that is, correcting the TBS so that the TBS is substantially constant (the coding rate varies less between subframes), regardless of the overhead in subframes.

For example, it is possible to correct the TBS depending on the overhead in subframes using the TBS table of existing LTE systems and/or the table that is newly defined in 5G. For example, the TBS that is selected in the same procedures as in existing LTE systems is corrected taking into account the overhead in each subframe. By thus controlling the TBS in consideration of overhead, it becomes possible to prevent the coding rates to apply to DL signals and/or UL signals (for example, DL/UL data channels) that are transmitted in different subframes from varying, and to prevent the throughput of the DL signals and/or the UL signals from decreasing.

Also, to provide another aspect to the present embodiment, the present inventors have come up with the idea of selecting TBSs from a table that lists TBSs, so that the coding rate is substantially constant (the coding rate varies less between subframes) regardless of the overhead in subframes.

Also, in accordance with one aspect of the present embodiment, when a user terminal corrects a TBS that has been selected based on DCI (for example, the MCS index, the number of PRBs allocated, etc.) transmitted from a radio base station, the radio base station may indicate to the user terminal, via higher layer signaling, whether or not TBS correction applies.

Now, the present embodiment will be described below in detail. Although cases will be shown in the following description where a transport block size table (TBS table) in existing LTE systems is used, this is not limiting. A table that is newly defined in 5G may be used.

Note that a subframe may be hereinafter referred to as a "transmission time interval (TTI)." A subframe may be 1 ms or shorter than 1 ms. A subframe that is shorter than 1 ms may be referred to as a "shortened subframe," a "short subframe," a "shortened TTI," a "short TTI" and so on. Furthermore, a subframe that is 1 ms may be referred to as a "normal subframe," a "normal TTI," a "long TTI," and/or the like.

Also, the present embodiment can also be applied to user terminals that can communicate using a plurality of TTIs having at least different numbers of symbols (for example, user terminals that use normal TTIs and shortened TTIs). Also, although LTE systems will be exemplified in the following description, the present embodiment is not limited to this. In addition, a plurality of embodiments that will be described below may be implemented individually or in combinations, as appropriate.

Furthermore, although cases will be shown with the following description where the TBS of data channels (including DL data channels and/or UL data channels) is controlled, the present embodiment is by no means limited to data channels, and can be applied to DL signals and/or UL signals that are transmitted and received using transport blocks.

(Method of Calculating Coding Rate)

According to the present embodiment, the coding rate of a data channel is calculated based on at least one of the TBS of the data channel, the modulation scheme, the number of PRBs allocated, the number of resource elements (REs) per PRB, and the overhead in a subframe.

For example, the coding rate R of a data channel may be calculated based on following equations 1 and 2.

$$R = \frac{TBS}{N_{DCH} \times Q_m} \quad \text{(Equation 1)}$$

$$N_{DCH} = N_{PRB} \times N_{RE} \times (1 - N_{OH}) \quad \text{(Equation 2)}$$

In above equation 1, TBS is the number of information bits that are allocated to a user terminal (a data channel for the user terminal)—that is, a TBS that is determined in the manner that will be described with the first aspect or the second aspect. $Q_m$ is the number of bits per modulated symbol, according to the data channel's modulation scheme.

Also, NDCH is the number of REs where the data channel can be mapped in the PRBs ($N_{PRB}$) allocated to the user terminal (a data channel for the user terminal).

Furthermore, in above equation 2, $N_{PRB}$ is the PRBs allocated to the user terminal (the data channel for the user terminal). $N_{RE}$ is the number of resource elements per PRB (for example, the number of symbols per subframe×the number of subcarriers). $N_{OH}$ is the proportion of overhead in the allocated PRBs.

Figure 8:
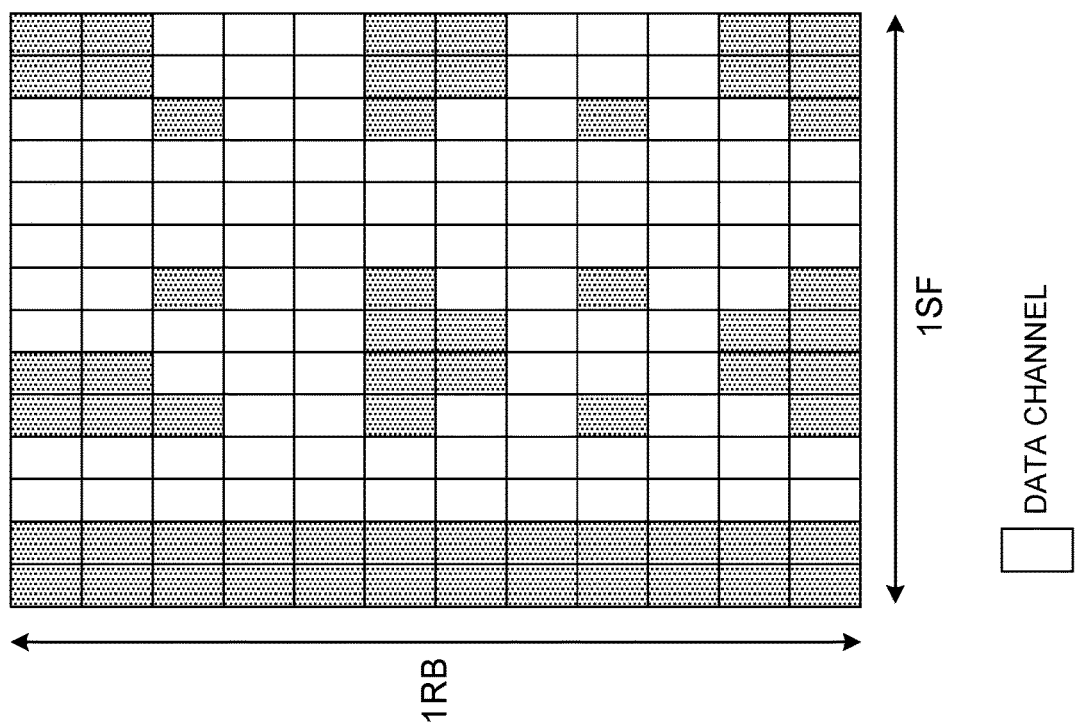
FIG. 8 is a diagram to show examples of resource elements where data channels can be mapped.

FIG. 8 is a diagram to show examples of resource elements where data channels can be mapped (the proportion of overhead). Although an example case will be illustrated below where one subframe is comprised of fourteen symbols and one PRB is comprised of twelve subcarriers, this is not limiting. As shown in FIG. 8, a data channel or a signal other than a data channel (for example, a control channel, a reference signal, etc.) is mapped to each RE. The proportion of overhead may be the proportion of the number of REs where signals other than data channels are mapped, with respect to the number of all REs in the PRBs allocated.

(Overhead Calculation Method)

Figure 9:
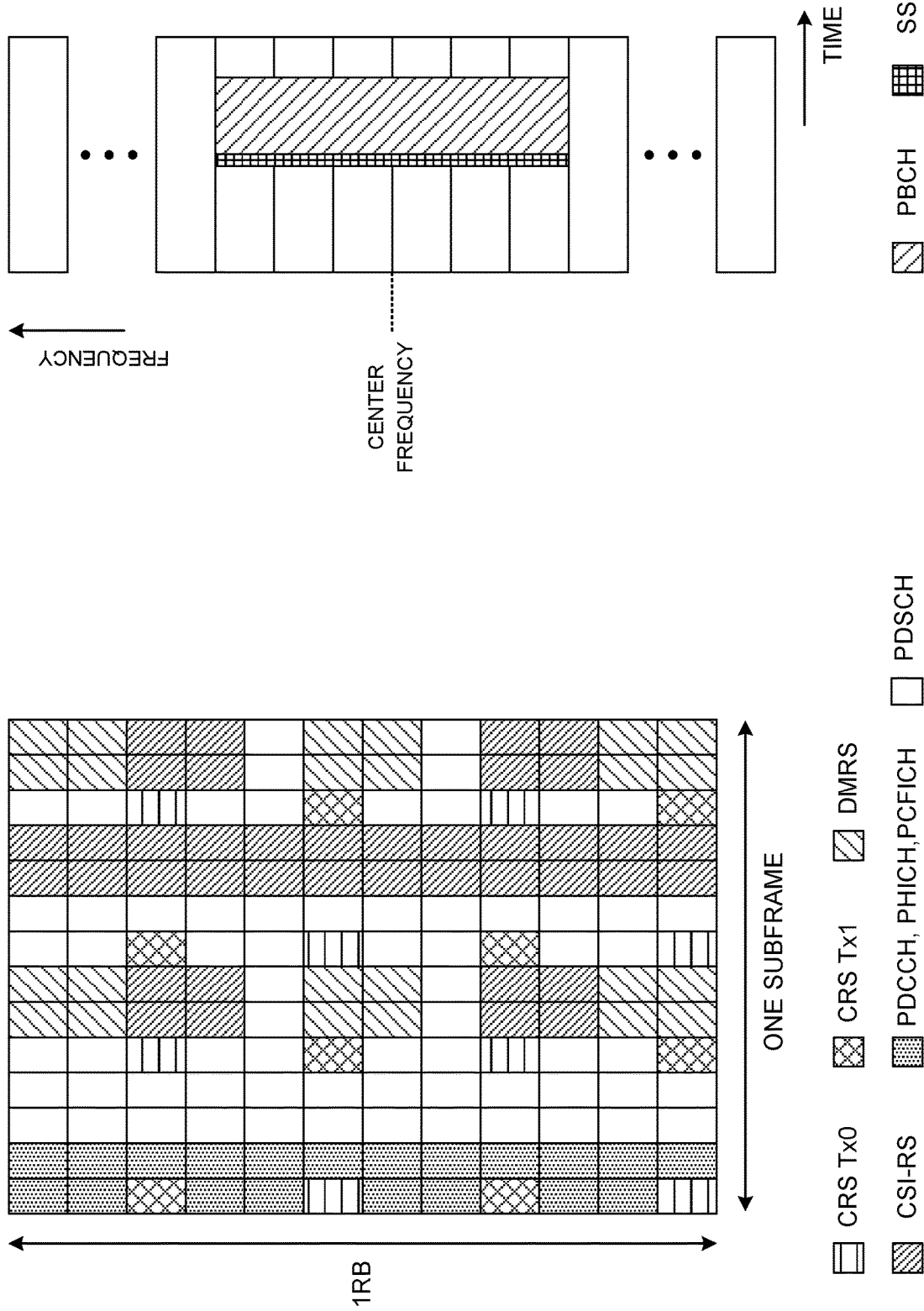
FIG. 9 is a diagram to show an example of the calculation of DL overhead.

Now, with reference to FIG. 8 and FIG. 9, the method for calculating overhead in the DL and the UL according to the present embodiment will be described. FIG. 9 is a diagram to show an example of the calculation of DL overhead. In the DL, in a PRB for allocating a DL data channel (for example, the PDSCH) signals other than the DL data channel can be mapped.

For example, as shown in FIG. 9, in a PRB for allocating a DL data channel, signals other than the DL data channel, which may be at least one of a cell-specific reference signal (CRS), a demodulation reference signal (DM-RS), a channel state information reference signal (CSI-RS), L1/L2 control channels (for example, a physical downlink control channel (PDCCH), a physical hybrid-ARQ indicator channel (PHICH), and a physical control format indicator channel (PCFICH), etc.), a broadcast channel (physical broadcast channel (PBCH)), and synchronization signals ("SSs," including "PSS (Primary SS)" and "SSSs (Secondary SSs)"), may be mapped.

The DL overhead may be the proportion (ratio) of the number of REs where signals other than above DL data channel are mapped, with respect to the number of all REs in the DL data channel-allocating PRB. Note that the method of calculating DL overhead is not limited to this, and any calculation method may be used as long as DL overhead is shown.

Figure 10:
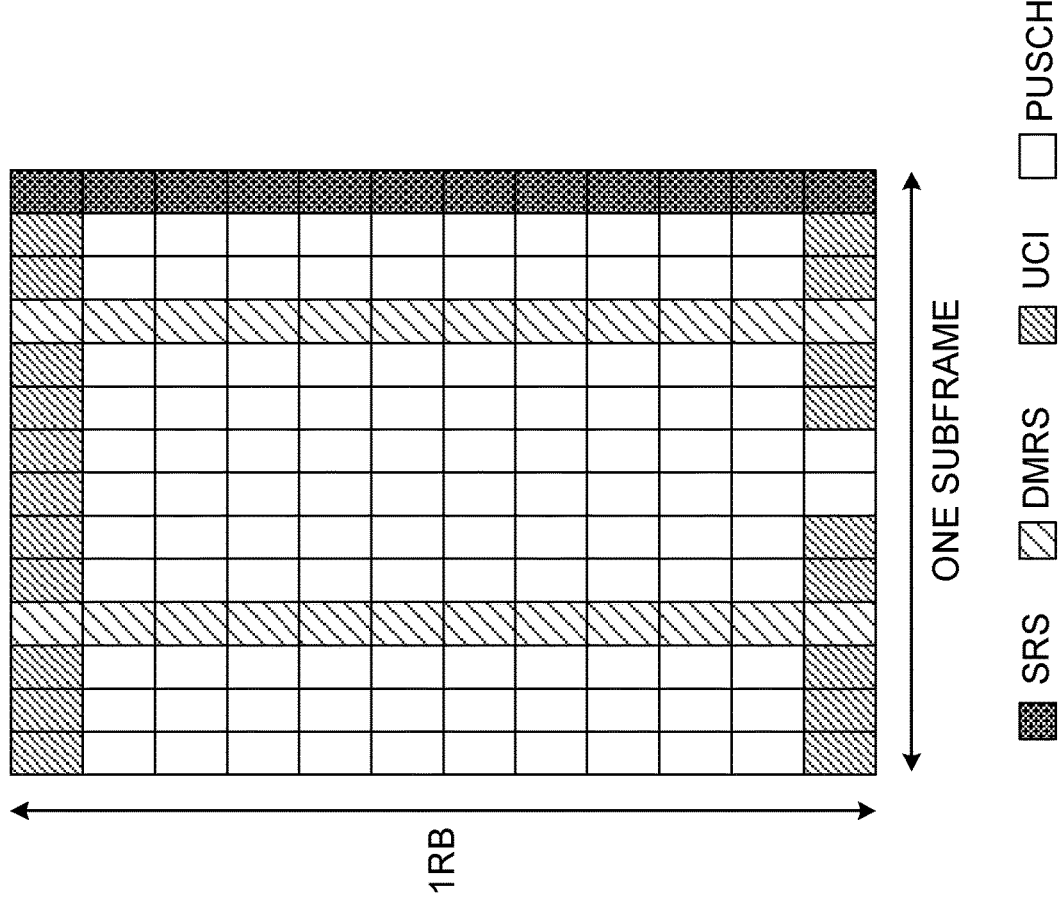
FIG. 10 is a diagram to show an example of the calculation of UL overhead.

FIG. 10 is a diagram to show an example of the calculation of UL overhead. In the UL, in a PRB for allocating a UL data channel, signals other than the UL data channel (for example, the PUSCH) can also be mapped.

For example, as shown in FIG. 10, in a PRB for allocating a UL data channel, signals other than the UL data channel, which may be at least one of a sounding reference signal (SRS), a demodulation reference signal (DM-RS), and uplink control information (UCI) (for example, retransmission control information (HARQ-ACK), channel state information (CSI) and so on), may be mapped.

The UL overhead may be the proportion (ratio) of the number of REs where signals other than above UL data channel are mapped, with respect to the number of all REs in the UL data channel-allocating PRB. Note that the method of calculating UL overhead is not limited to this, and any calculation method may be used as long as UL overhead is shown.

In accordance with the present embodiment, a method of correcting the TBS (first aspect) and a method of selecting the TBS (second aspect), based on overhead calculated as described above, will be described. Hereinafter, overhead refers to both DL overhead and/or UL overhead, which have been described above. Furthermore, the coding rate in the following description is calculated using the above calculation method (for example, equation 1 and equation 2).

(First Aspect)

In accordance with a first aspect of the present invention, a case will be described below where the TBS is corrected so that the coding rate of a data channel transmitted and received in each individual subframe varies little, irrespective of the overhead in each subframe. To be more specific, with the following description, a case will be shown in which, using a TBS table for existing LTE systems, the TBS is corrected according to the overhead in each subframe.

In addition, the following correction methods are used in radio base stations and/or user terminals. When the following correction methods are used on the user terminal side, a user terminal can apply one of the following correction methods to a TBS, selected from a TBS table, depending on the MCS index (also referred to as the "modulation and coding scheme and redundancy version field"), which is included in DCI from a radio base station, and the data channel-allocating PRB.

On the other hand, when the correction methods are used on the radio base station side, a radio base station can apply one of the following correction methods to a TBS, selected from a TBS table, depending on the MCS index, which is determined based on a CQI from the user terminal or UL received quality, and the data channel-allocating PRB. Alternatively, the radio base station may report information about corrected TBSs to the user terminal. In this case, the TBS correction process in the user terminal may be omitted.

(First Correction Method)

In the first correction method, a threshold for overhead or the coding rate that is calculated based on the overhead is configured, and if there is a subframe where the TBS is equal to or greater than the threshold (or beyond the threshold), this TBS is corrected (changed and adjusted). For example, for this subframe, at least one of the MCS index ($I_{MCS}$), the TBS index ($I_{TBS}$), and the number of resource blocks ($N_{PRB}$) when the TBS is selected from the TBS table is controlled to be reduced by a predetermined value. In other words, only one of $I_{MCS}$, $I_{TBS}$ and $N_{PRB}$ may be changed, or any two of these values may be changed, or all of the three values may be changed.

Here, the threshold for overhead or the coding rate calculated based on this overhead may be determined in advance in the specification, may be dynamically specified via DCI, and may be semi-statically indicated via higher layer signaling such as RRC signaling or via broadcast information. Also, multiple thresholds may be configured. For example, different thresholds may be used depending on the modulation scheme. In addition, one of a plurality of semi-statically configured thresholds may be dynamically designated.

Furthermore, a predetermined value (degree of reduction) whereby at least one of the MCS index, the TBS index, and the number of resource blocks when TBS is selected from the TBS table is reduced may be determined in advance in the specification, may be specified dynamically via DCI, and may be semi-statically specified via higher layer signaling such as RRC signaling or via broadcast information. Also, the degree of reduction may be configured multiple times. For example, different degrees of reduction may be applied depending on the modulation scheme. In addition, one of the degrees of reduction that is semi-statically configured may be specified dynamically. Different degrees of reduction may also be applied to $I_{MCS}$, $I_{TBS}$ and $N_{PRB}$ respectively.

FIG. 11 shows an example of the 1 correction method. Here, as an example, the TBS index ($I_{TBS}$) is 5, the number of PRB ($N_{PRB}$) allocated to the data channel is 10, the number of all REs in the allocated PRB is 1680 (=12×10× 14) (when one PRB is twelve subcarriers, one subframe is fourteen symbols, and the number of PRBs allocated is ten), and the modulation scheme is QPSK.

For example, FIG. 11 assumes the case where the overheads of subframes (SF) #1, #2, and #3 are 30%, 10%, and 20%, respectively. In addition, when the overhead is equal to or larger than the predetermined threshold value (here, 25%) as the correction condition, at least one of the MCS index ($I_{MCS}$), the TBS index ($I_{TBS}$), and the number of resource blocks ($N_{PRB}$) when TBS is selected from the TBS table is reduced by a predetermined value (in this case, $I_{TBS}$ is reduced by 1). Note that the conditions that can be applied to the present embodiment are not limited to this.

When the TBS is selected (before correction) as in existing LTE systems, the TBS that is selected based on $I_{TBS}$ and $N_{PRB}$ is 872. In this case, for example, according to the above equations 1 and 2), the coding rate (R) of the data channel in each subframe is R=0.37 (SF #1), R=0.29 (SF #2), and R=0.32 (SF #3). Thus, as the overhead increases, since the number of REs to which the data channel can be mapped decreases the subframe with larger overhead is configured with higher coding rate applied to the data channel.

When adopting the first correction method, with respect to the subframe #1 in which the overhead is equal to or larger than the predetermined threshold (here, 25%), at least one of MCS index ($I_{MCS}$), TBS index ($I_{TBS}$), and the number of resource blocks ($N_{PRB}$) when TBS is selected from the TBS table for the subframe #1 is reduced by a predetermined value (in this case, $I_{TBS}$ can be lowered by 1). In this case, $I_{TBS}$ is updated from 5 to 4, and TBS (696) with $I_{TBS}$ of 4 is applied for subframe #1. Accordingly, if the above-described equations 1 and 2 are used, By this means, the coding rate to apply to the data channel of SF #1 can be adjusted from R=0.37 to 0.30. As a result, the difference between the coding rates of subframes #1, #2, and #3 can be reduced (preferably to be constant).

FIG. 11 assumes that the overhead is equal to or greater than the predetermined threshold as the condition for correcting the TBS, but the condition of the correction is not limited thereto. when the overhead exceeds a predetermined threshold, or the coding rate calculated based on the overhead is equal to or greater than a predetermined threshold (or when the coding rate exceeds a predetermined threshold), TBS may be corrected.

In this manner, by correcting the TBS by changing at least one of $I_{MCS}$, $I_{TBS}$, and $N_{PRB}$ when TBS is selected from the TBS table is determined depending on overhead or the coding rate that is calculated based on this overhead, it is possible to prevent the coding rate to apply to a data channel from varying between subframes with different overheads, and to reduce the received quality of the data channel from changing in each subframe. By this means, it is possible to reduce the decrease of data channel throughput in each subframe.

Also, by correcting the TBS by changing at least one of $I_{MCS}$, $I_{TBS}$, and $N_{PRB}$ upon selection of the TBS from the TBS table based on overhead or based on the coding rate that is calculated from this overhead, it is possible to use values that are defined in the TBS table in advance. By this means, zero filler bits are used, so that filler bit-induced propagation loss can be prevented. Note that "filler bits" refers to bits that are added to adjust the size of data bits when the data bits are encoded, and are also referred to as "padding bits" and so on. In addition, when the radio base station and the user terminal each correct the TBS on a blind basis, there is no need to report the corrected TBS to the user terminal. This can reduce the overhead in the DL.

(Second Correction Method)

According to a second correction method, the TBS is corrected per subframe, based on overhead. For example, a TBS (before correction) that is selected in the same way as in existing LTE systems is multiplied by each subframe's overhead-related coefficient (hereinafter referred to as an "overhead coefficient"), and the TBS of each subframe may be corrected to the value that is closest to the multiplication result in the TBS table.

FIG. 12 shows an example of the second correction method. Here, an example case will be described below, in which the TBS ($I_{TBS}$) index is 5, the number of PRBs ($N_{PRB}$) allocated to a data channel is 10, the total number of REs in the allocated PRBs is 1680 (=12×10×14) (when one PRB is twelve subcarriers, one subframe is fourteen symbols and the number of PRBs allocated is ten), and the modulation scheme is QPSK.

For example, FIG. 12 assumes a case where the overheads of subframes #1, #2 and #3 are 30%, 10% and 20%, respectively. Also, a case is assumed here in which the proportion of the number of REs where a data channel is mapped in a data channel-allocating PRB (that is, 1—overhead is used as the overhead coefficient. For example, in FIG. 9, the overhead coefficients of subframes #1, #2 and #3 are 0.7, 0.9, and 0.8, respectively. Note that the overhead coefficient is not limited to this.

When the TBS is selected (before correction) as in existing LTE systems, the TBS that is selected in each subframe based on $I_{TBS}$ and $N_{PRB}$ is 872. In this case, for example, according to the above equations 1 and 2, in each subframe, a data channel has a coding rate (R) of R=0.37 (SF #1), R=0.29 (SF #2) or R=0.32 (SF #3).

When the second correction method is adopted, in subframe #1, the TBS "872," selected based on $I_{TBS}$ and $N_{PRB}$, is multiplied by an overhead coefficient of "0.7." The TBS is then corrected to "600," which is the closest value in the TBS table to the multiplication result of the TBS before correction and the overhead coefficient, namely "872× 0.7=610.4."

Similarly, in subframes #2 and #3, the TBS "872" that is selected based on $I_{TBS}$ and $N_{PRB}$ is multiplied by overhead coefficients "0.9" and "0.8." The TBS is then corrected to "776" and "712," which are the closest values in the TBS table to the multiplication results of "784.8" and "697.6."

As a result of this, when above equations 1 and 2 are used, as shown in FIG. 12, the coding rates in subframes #1, #2 and #3 can all be corrected to 0.26, so that the differences among the coding rates to apply to a data channel that is transmitted in subframes with varying overheads can be reduced (be made constant, preferably).

Thus, by multiplying a TBS by a different overhead coefficient for each subframe, it is possible to prevent the coding rate to apply to a data channel from varying between subframes with different overheads, and to reduce the received quality of the data channel from changing in each subframe. By this means, it is possible to reduce the decrease of data channel throughput in each subframe.

In addition, values in the TBS table that are closest to the multiplication results of the TBS before correction and overhead coefficients are used as corrected values, so that the values that are provided in advance in the TBS table can be used. By this means, zero filler bits are used, so that filler bit-induced propagation loss can be prevented. In addition, when the radio base station and the user terminal each correct the TBS on a blind basis, there is no need to report the corrected TBS to the user terminal. This can reduce the overhead.

(Third Correction Method)

According to a third correction method, a target coding rate (desired coding rate) is determined, so that the TBS that is closest to the TBS to have the target coding rate may be selected from the TBS table. For example, the target coding rate can be configured per MCS index or TBS index. Furthermore, the target coding rate may be defined in advance in the specification, o may be reported to the user terminal via higher layer signaling and/or in downlink control information (DCI).

Figure 13:
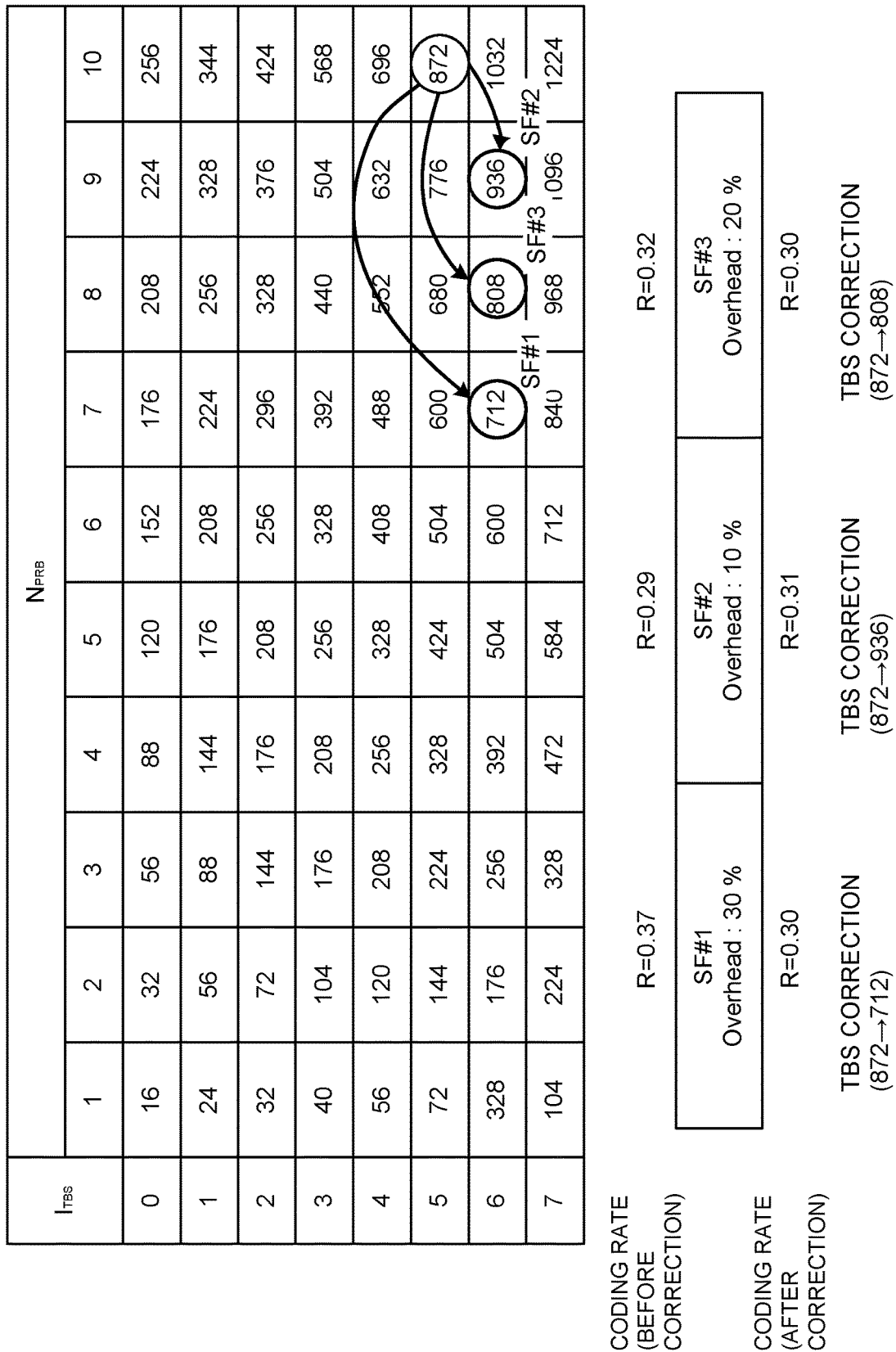
FIG. 13 is a diagram to show another example of the method for correcting the TBS (third correction method)

FIG. 13 shows an example of the third correction method. Here, an example case will be described below, in which the TBS index ($I_{TBS}$) is 5, the number of PRBs ($N_{PRB}$) allocated to a data channel is 10, the total number of REs in the allocated PRBs is 1680 (=12×10×14) (when one PRB is twelve subcarriers, one subframe is fourteen symbols and the number of PRBs allocated is ten), and the modulation scheme is QPSK.

For example, FIG. 13 assumes a case where the overheads of subframes #1, #2 and #3 are 30%, 10% and 20%, respectively. When the TBS is selected (before correction) as in existing LTE systems, the TBS that is selected in each subframe based on $I_{TBS}$ and $N_{PRB}$ is 872.

Here, the target coding rate when the TBS index ($I_{TBS}$) is 5 (the MCS index ($I_{MCS}$) is 5) is 0.30. In this case, according to above equations 1 and 2, the TBS to have the target coding rate 0.3 in subframe #1 is "705.6." The TBS that is closest to "705.6" in the TBS table is "712," so that the TBS of subframe #1 is corrected from "872" to "712."

Similarly, according to above equations 1 and 2, the TBSs to have the target coding rate 0.3 in subframes #2 and #3 are "907.2" and "806.4," respectively. The TBSs that are closest to "907.2" and "806.4" in the TBS table are "936" and "808," respectively, so that the TBSs of subframes #2 and #3 are corrected from "872" to "936" and "8081."

Based on the TBSs "712," "936," and "808" of subframes #1, #2, and #3 corrected as described above, the coding rates of subframes #1, #2, and #3 calculated from these using above equations 1 and 2 are 0.30, 0.31, and 0.30, respectively. Consequently, the differences among the coding rates to apply to a data channel that is transmitted in subframes with varying overheads can be reduced (be made constant, preferably).

Thus, by correcting the TBS based on a target coding rate, it is possible to prevent the coding rate from varying between subframes with different overheads, and to prevent the received quality of a data channel from changing in each subframe (that is, prevent excessive quality or insufficient quality). By this means, it is possible to reduce the decrease of data channel throughput in each subframe.

Furthermore, by using the value that is closest to the TBS having the target coding rate in the TBS table as the correction value, zero filler bits are used, so that filler bit-induced propagation loss can be prevented. In addition, when the radio base station and the user terminal each correct the TBS on a blind basis, there is no need to report the corrected TBS to the user terminal. This can reduce the overhead in the DL.

Note that arrangements may be made in advance so that, when there are a plurality of TBS values (for example, two kinds) in the TBS table that are closest to the target coding rate, one of these values (for example, the higher value or the low value) is selected for the TBS value. Alternatively, which TBS value (for example, the higher value or the lower value) is to be selected may be reported to the user terminal via signaling (RRC signaling and/or downlink control information).

(Second Aspect)

In accordance with a second aspect of the present invention, a case will be described below where the TBS is selected, by using a table which at least lists TBSs, so that the coding rate is substantially constant within a subframe. The TBS selection method which will be described below as the second aspect can be applied to DL signals (for example, DL data channels) and/or UL signals (for example, UL data channels). Hereinafter, DL data channels and/or UL data channels will be collectively referred to as "data channels."

According to the second aspect, first, a table in which TBSs are listed (a table to list TBSs that use zero filler bits) is defined in advance. Also, target modulation schemes and/or coding rates that correspond to received quality information such as CQI indices, or MCS indices that are found based on the received quality information, are also provided in advance. As a table to list TBSs, an existing TBS table (first TBS table) may be used, or a table in which only TBS values are defined may be used (second TBS table).

FIG. 14A shows an example of a table in which target modulation schemes and coding rates are configured in association with CQI indices, or MCS indices that are found based on received quality information. FIG. 14B shows an example of a table in which TBSs are listed. The tables of FIGS. 14A and 14B may be defined in advance in the specification, or may be reported from the radio base station to the user terminal via higher layer signaling and/or downlink control information. Alternatively, the radio base station may configure the table of FIG. 14A and/or FIG. 14B in a user terminal that uses the TBS selection based on the target coding rate.

The radio base station and/or the user terminal derive a pre-configured target modulation scheme and target coding rate from, for example, received quality information, an MCS index that is found based on the received quality information, and so on. Then, the radio base station and/or the user terminal select the TBS to show the closest value to the target coding rate in the TBS-listing table.

Here, an example of the method of selecting the TBS in a subframe, in which the number of REs where a data channel can be mapped is 1000, and in which the CQI index or the MCS index is 3 will be described.

First, the radio base station derives the target modulation scheme (here, 16QAM) and the target coding rate (here, 0.3) when the CQI index or the MCS index is 3, from the table shown in FIG. 14A.

Next, a TBS with a coding rate of 0.3 is selected. For example, the user terminal finds a TBS (here, TBS=1200) having a coding rate of 0.3 by using equation 1 and so on, and then selects the TBS that is closest to the TBS that is found, in the TBS-listing table (second table in FIG. 14B).

When the table of FIG. 14B is used, 1160 is selected, as the TBS value where the TBS is closest to 1200. Note that the coding rate when the TBS value is 1160 is 0.29, and can be configured approximately equal to the target coding rate 0.3.

In this way, by selecting a TBS in a TBS table considering the target coding rate that is configured in advance, it is possible to configure the coding rate substantially constant irrespective of the number of symbols in each TTI.

Also, by selecting a TBS value from the values provided in a TBS table, zero filler bits are used, so that filler bit-induced propagation loss can be prevented. In addition, when the radio base station and the user terminal each select the TBS on a blind basis, there is no need to report the selected TBS to the user terminal. This can reduce the overhead in the DL.

Note that arrangements may be made in advance so that, when there are a plurality of TBS values (for example, two kinds) in the TBS table that are closest to the target coding rate, one of these values (for example, the higher value or the low value) is selected for the TBS value. Alternatively, which TBS value (for example, the higher value or the lower value) is to be selected may be reported to the user terminal via signaling (RRC signaling and/or downlink control information).

Also, the radio base station may report to the user terminal whether or not to apply the TBS selection based on the target coding rate. For example, arrangements may be made so that the radio base station reports to the user terminal, using higher layer signaling and/or DCI, whether or not the TBS selection based on the target coding rate is to be used, and the user terminal, where TBS selection is commanded, performs the following selection method. By this means, it is possible to flexibly configure whether or not to perform TBS selection based on the target coding rate, taking into consideration the number of symbols in TTIs used by the user terminal and so on.

(Radio Communication System)

Now, the structure of a radio communication system according to an embodiment of the present invention will be described below. In this radio communication system, the radio communication method according to each above-described embodiment is employed. Note that the radio communication method according to each embodiment may be used alone or may be used in combination.

Figure 15:
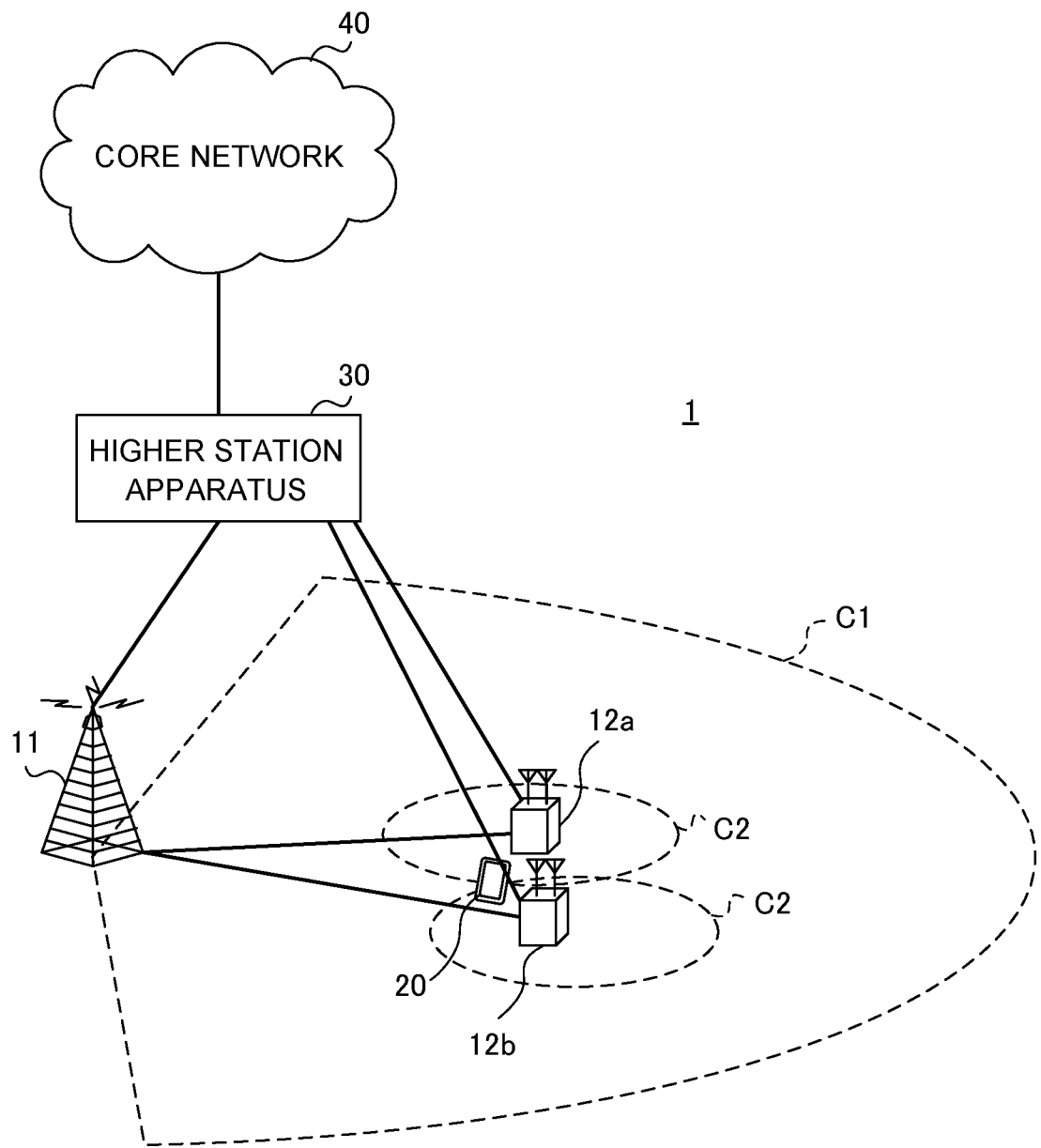
FIG. 15 is a diagram to show an example of a schematic structure of a radio communication system according to the present embodiment.

FIG. 15 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Also, the radio communication system 1 has a radio base station (for example, an LTE-U base station) that is capable of using unlicensed bands.

Note that the radio communication system 1 may be referred to as "SUPER 3G," "LTE-A (LTE-Advanced)," "IMT-Advanced," "4G" (4th generation mobile communication system), "5G (5th generation mobile communication system)," "FRA" (Future Radio Access) and so on.

The radio communication system 1 shown in FIG. 15 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2. For example, a mode may be possible in which the macro cell C1 is used in a licensed band and the small cells C2 are used in unlicensed bands (LTE-U). Also, a mode may be also possible in which part of the small cells is used in a licensed band and the rest of the small cells are used in unlicensed bands.

The user terminals 20 can connect with both the radio base station 11 and the radio base stations 12. The user terminals 20 may use the macro cell C1 and the small cells C2 at the same time by means of CA or DC.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these. Furthermore, the user terminals 20 can communicate with the radio base station 11 and/or the radio base stations 12 using a plurality of TTIs with different numbers of symbols.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise. Also, it is preferable if radio base stations 10 that use the same unlicensed band on a shared basis are configured to be synchronized with each other in time.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. The PDSCH may be referred to as a "downlink data channel." User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. A CFI (Control Format Indicator), which indicates the number of OFDM symbols to use for the PDCCH, is communicated by the PCFICH. HARQ delivery acknowledgement information (ACK/NACK) in response to the PUSCH is communicated by the PHICH. The EPDCCH is frequency-division-multiplexed with the PDSCH, and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an "uplink data channel." User data and higher layer control information are communicated by the PUSCH. Also, downlink radio quality information (CQI: Channel Quality Indicator), delivery acknowledgement information (ACK/NACK) and so on are communicated by the PUCCH. By means of the PRACH, random access preambles for establishing connections with cells are communicated.

In the radio communication system 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the discovery and/or measurement reference signal (DRS: Discovery Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 16:
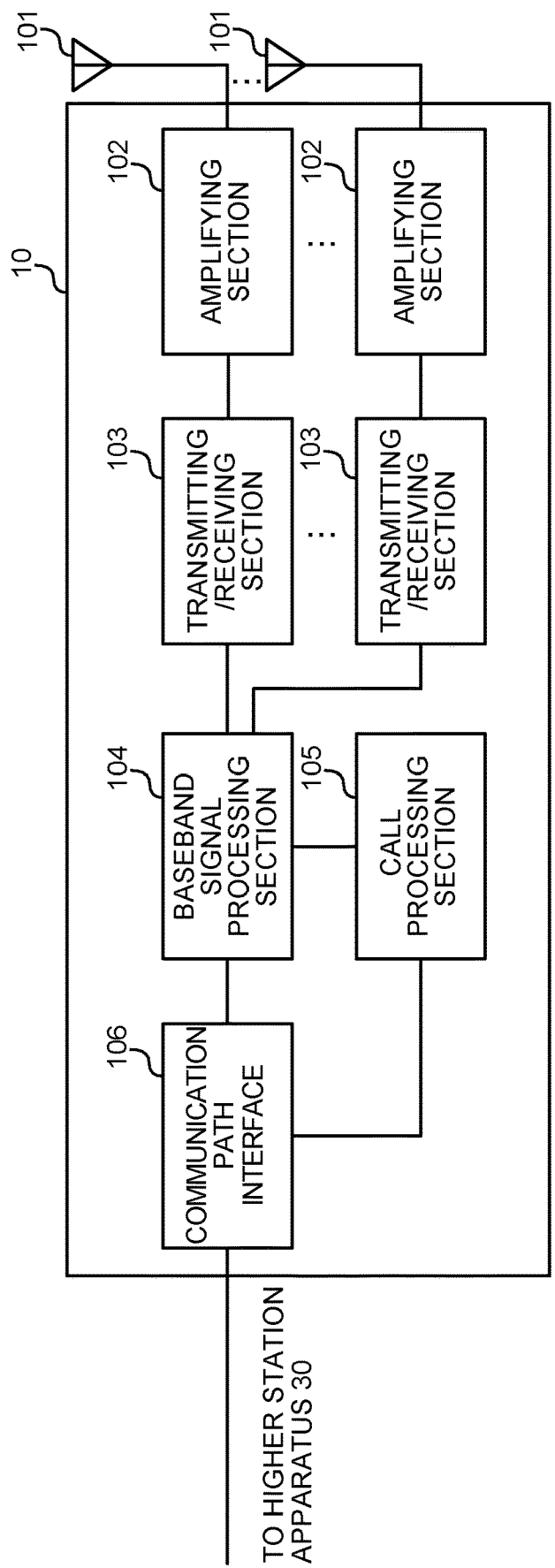
FIG. 16 is a diagram to show an example of an overall structure of a radio base station according to the present embodiment.

FIG. 16 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 through the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can transmit and receive UL and/or DL (hereinafter "UL/DL") signals. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Now that the transmitting/receiving sections 103 transmit DL signals and/or receive UL signals in subframes. For example, the transmitting/receiving sections 103 transmit downlink control information, which includes an MCS index ($I_{MCS}$) and the number of PRBs allocated to a DL signal and/or a UL signal, to the user terminal 20. To be more specific, the transmitting/receiving sections 103 transmit the number of PRBs to allocate to a UL data channel and the MCS index to apply to the UL data channel using a UL grant, and transmit the number of PRBs to allocate to a DL data channel and the MCS index to apply to the DL data channel using a DL assignment.

Figure 17:
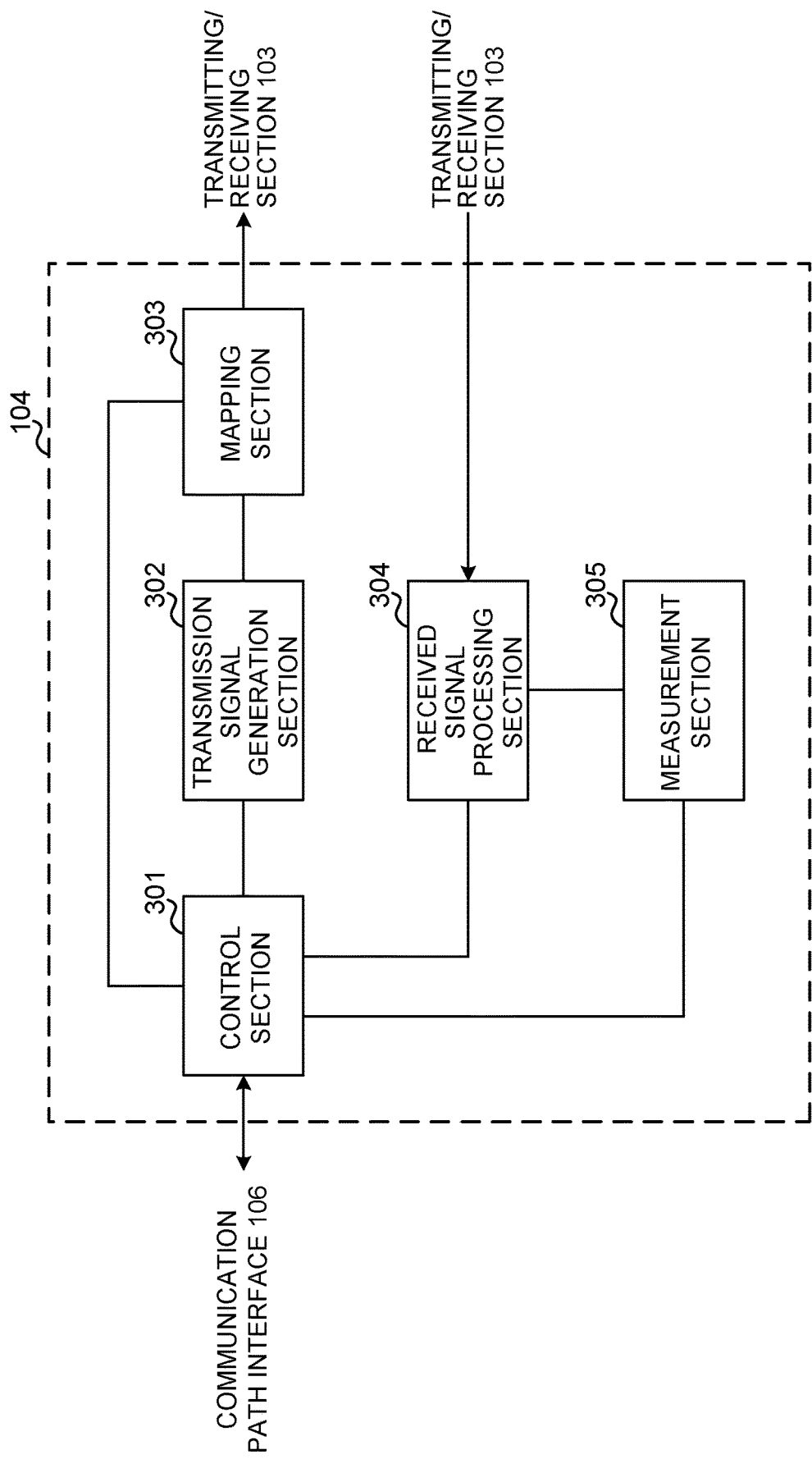
FIG. 17 is a diagram to show an example of a functional structure of a radio base station according to the present embodiment.

FIG. 17 is a diagram to show an example of a functional structure of a radio base station according to the present embodiment. Note that, although FIG. 17 primarily shows functional blocks that pertain to characteristic parts of the present embodiment, the radio base station 10 has other functional blocks that are necessary for radio communication as well. As shown in FIG. 17, the baseband signal processing section 104 at least has a control section (scheduler) 301, a transmission signal generation section 302, a mapping section 303, a received signal processing section 304 and a measurement section 305.

The control section (scheduler) 301 controls the whole of the radio base station 10. For example, the control section 301 controls communication in subframes. The control section 301 can be constituted by a controller, a control circuit or control apparatus that can be described based on general understanding of the technical field to which the present invention pertains.

The control section 301, for example, controls the generation of DL signals in the transmission signal generation section 302, the allocation of DL signals by the mapping section 303, and so on. Furthermore, the control section 301 controls the signal receiving processes in the received signal processing section 304, the measurements of signals in the measurement section 305, and so on. The control section 301 controls the scheduling, generation, mapping, transmission and so on of DL signals (system information, DCI-transmitting PDCCH/EPDCCH, PDSCH, reference signals, synchronization signals, etc.). Furthermore, the control section 301 controls the scheduling, receipt and so on of UL signals (PUSCH, PUCCH, PRACH, reference signals, etc.).

In addition, the control section 301 controls the transport block sizes (TBSs) of DL signals and/or UL signal (for example, DL data channels and/or UL data channels). For example, the control section 301 may correct each individual TBS that is selected from a TBS table so that the coding rate varies little between signals transmitted and/or received in subframes with varying overheads (see the above-described first aspect), or the control section 301 may select each TBS based on a target coding rate (desired coding rate) (see the above-described second aspect).

For example, if there is a subframe, where the overhead in the subframe or the coding rate that is calculated based on the overhead is equal to or larger than a predetermined threshold, the control section 301 may correct the TBS selected from the TBS table (first correction method). To be more specific, given a subframe where the overhead in the subframe or the coding rate that is calculated based on the overhead is equal to or larger than a predetermined threshold, the control section 301 reduces at least one of the MCS index, ($I_{MCS}$), the TBS index ($I_{TBS}$) and the number of resource blocks ($N_{PRB}$) upon selection of the TBS from the TBS table, by a predetermined value, and selects a TBS that corresponds to at least one of reduced $I_{MCS}$, $I_{TBS}$ and $N_{PRB}$, from the TBS table (see FIG. 11).

Alternatively, the control section 301 may correct the TBS selected from the TBS table based on the overhead in the subframe, and re-select the TBS that is closest to the corrected value in the TBS table (see the above-described second correction method and FIG. 12).

Alternatively, the control section 301 may selects a target coding rate (desired coding rate), and if there is a TTI where the coding rate configured is different from the target coding rate, corrects the TBS (make selections from the TBS table) to be closer to the target coding rate (see the third correction method described above, and FIG. 13).

Alternatively, based on a table which at least lists TBSs, and based on a target modulation scheme and a target coding rate that are configured in association with a CQI index and/or an MCS index, the control section 301 selects the TBS that is closest to the target coding rate in the table (see the above-described second aspect and FIG. 14).

The transmission signal generation section 302 generates DL signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments for reporting information about downlink resource allocation and UL grants for reporting information about uplink resource allocation, based on commands from the control section 301. Also, downlink data signals are subjected to a coding process and a modulation process by using coding rates, modulation schemes and so on, which are determined based on the results of CSI measurements in each user terminal 20 and so on. Also, the transmission signal generation section 302 generates a DRS that includes a PSS, an SSS, a CRS, a CSI-RS and so on.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

<User Terminal>

Figure 18:
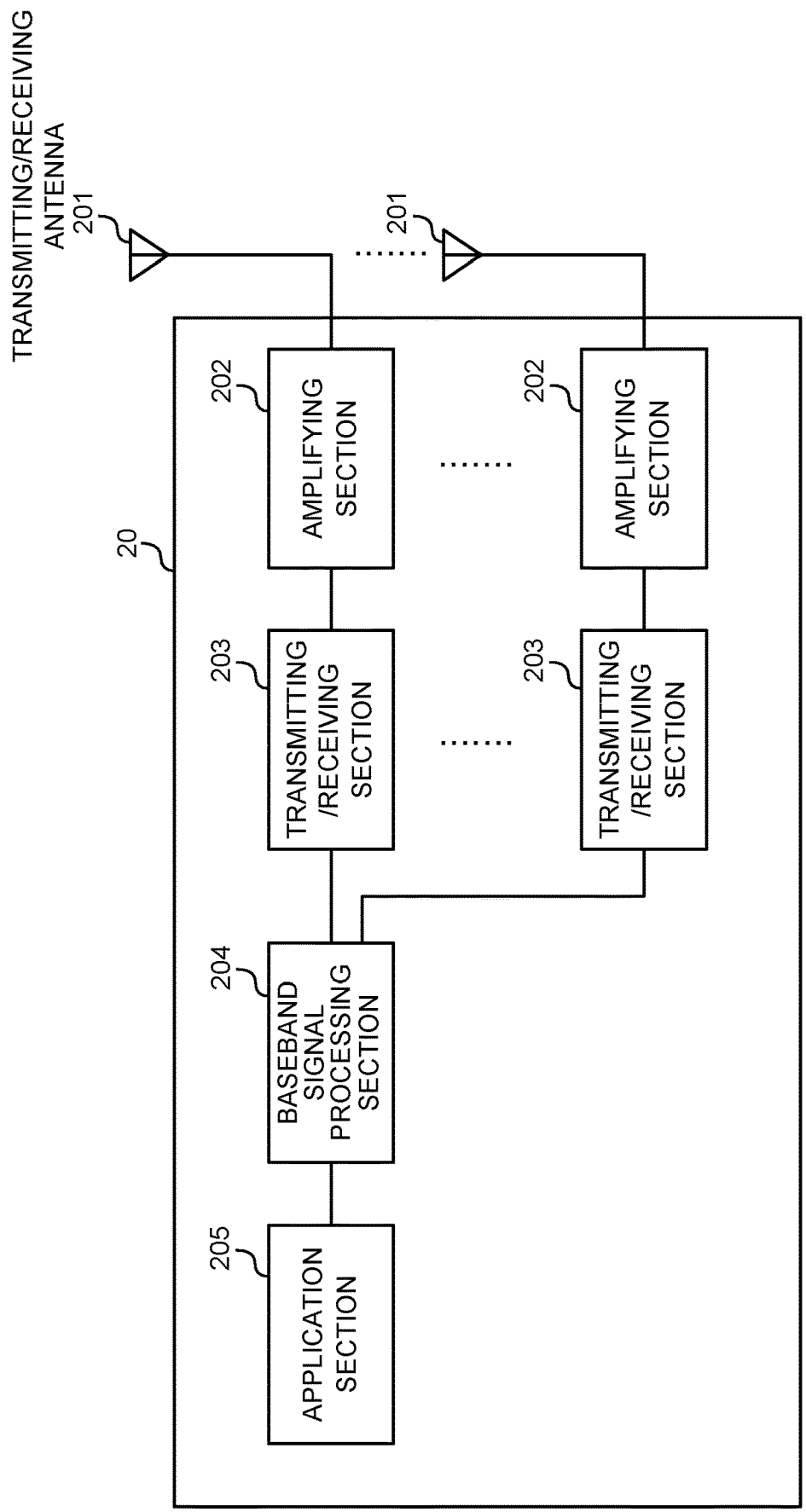
FIG. 18 is a diagram to show an example of an overall structure of a user terminal according to the present embodiment.

FIG. 18 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. The transmitting/receiving sections 203 are capable of transmitting/receiving UL/DL signals in unlicensed bands. Note that the transmitting/receiving sections 203 may be capable of transmitting/receiving UL/DL signals in licensed bands as well.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals and/or transmit UL signals in subframes. For example, the transmitting/receiving sections 203 receive DCI, which includes an MCS index ($I_{MCS}$) and the number of PRBs allocated to a DL signal and/or a UL signal. To be more specific, the transmitting/receiving sections 203 receive the number of PRBs to allocate to a UL data channel and the MCS index to apply to the UL data channel using a UL grant, and receive the number of PRBs to allocate to a DL data channel and the MCS index to apply to the DL data channel using a DL assignment.

Figure 19:
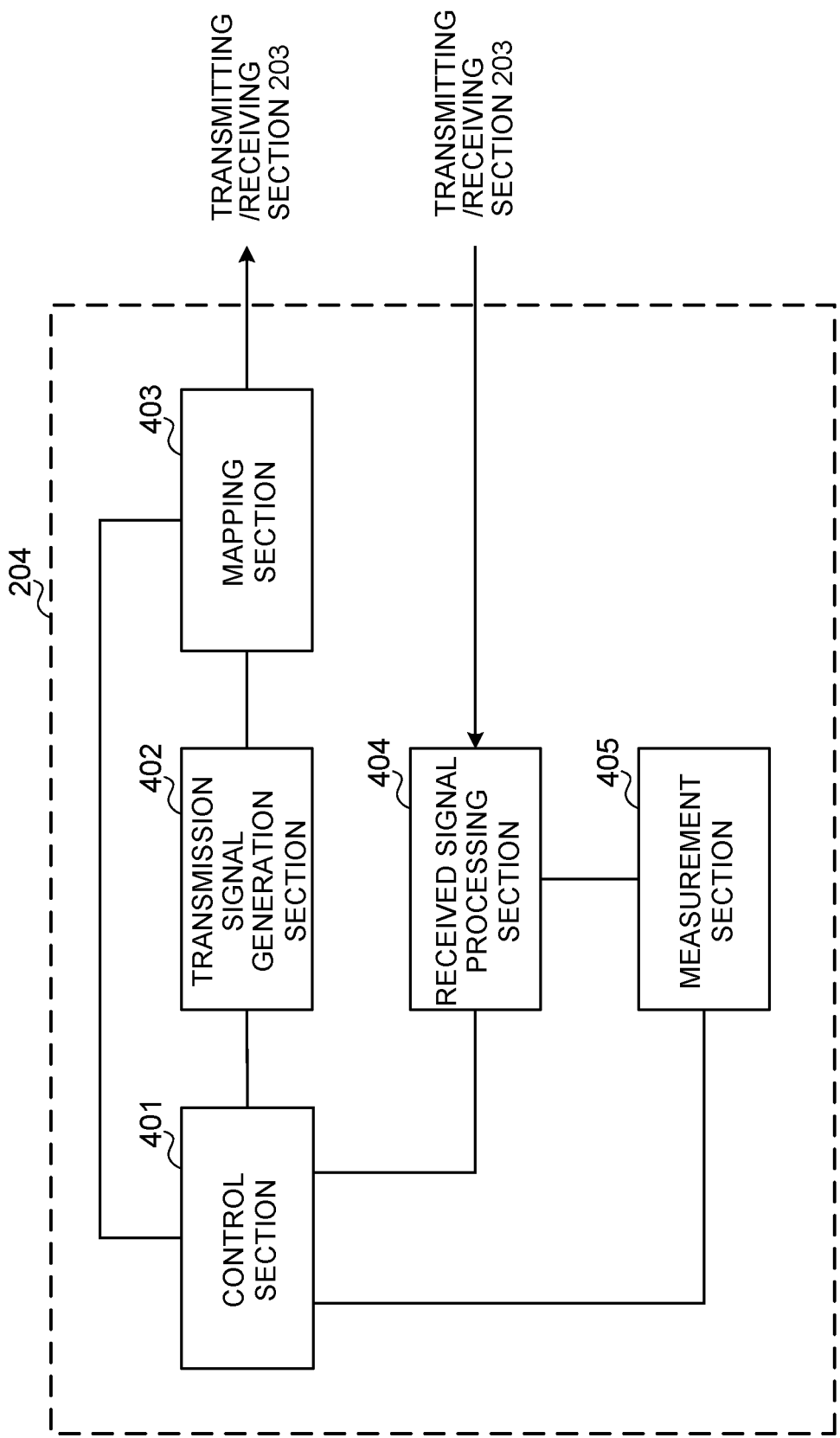
FIG. 19 is a diagram to show an example of a functional structure of a user terminal according to the present embodiment.

FIG. 19 is a diagram to show an example of a functional structure of a user terminal according to the present embodiment. Note that, although FIG. 19 primarily shows functional blocks that pertain to characteristic parts of present embodiment, the user terminal 20 has other functional blocks that are necessary for radio communication as well. As shown in FIG. 19, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of UL signals in the transmission signal generation section 402, the allocation of UL signals by the mapping section 403, and so on. Furthermore, the control section 401 controls the DL signal receiving processes in the received signal processing section 404, the measurements of signals in the measurement section 405, and so on.

The control section 401 acquires the DL signals (PDCCH/EPDCCH, PDSCH, downlink reference signals, synchronization signals, etc.) transmitted from the radio base station 10, from the received signal processing section 404. The control section 401 controls the generation of UL signals (for example, PUCCH, PUSCH, etc.) based on the DCI that is included in the PDCCH/EPDCCH (downlink control signals), the decoding result of the PDSCH (downlink data signal) and so on.

Furthermore, the control section 401 controls the transport block sizes (TBSs) of DL signals and/or UL signals (for example, DL data channels and/or UL data channels). For example, the control section 401 may correct each individual TBS that is selected from a TBS table so that the coding rate varies little between signals transmitted and/or received in subframes with varying overheads (see the above-described first aspect), or the control section 401 may select each TBS based on a target coding rate (desired coding rate) (see the above-described second aspect).

For example, if there is a subframe, where the overhead in the subframe or the coding rate that is calculated based on the overhead is equal to or larger than a predetermined threshold, the control section 401 may correct the TBS selected from the TBS table (first correction method). To be more specific, given a subframe where the overhead in the subframe or the coding rate that is calculated based on the overhead is equal to or larger than a predetermined threshold, the control section 401 reduces at least one of the MCS index, ($I_{MCS}$), the TBS index ($I_{TBS}$) and the number of resource blocks ($N_{PRB}$) upon selection of the TBS from the TBS table, by a predetermined value, and selects a TBS that corresponds to at least one of reduced $I_{MCS}$, $I_{TBS}$ and $N_{PRB}$, from the TBS table (see FIG. 11).

Alternatively, the control section 401 may correct the TBS selected from the TBS table based on the overhead in the subframe, and re-select the TBS that is closest to the corrected value in the TBS table (see the above-described second correction method and FIG. 12).

Alternatively, the control section 401 may selects a target coding rate (desired coding rate), and if there is a subframe where the coding rate configured is different from the target coding rate, corrects the TBS (make selections from the TBS table) to be closer to the target coding rate (see the third correction method described above, and FIG. 13).

Alternatively, based on a table which at least lists TBSs, and based on a target modulation scheme and a target coding rate that are configured in association with a CQI index and/or an MCS index, the control section 401 selects the TBS that is closest to the target coding rate in the table (see the above-described second aspect and FIG. 14).

The transmission signal generation section 402 generates UL signals based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains. For example, when DCI (UL grant) addressed to the user terminal 20 is included in a downlink control signal from the radio base station 10, the transmission signal generation section 402 is commanded by the control section 401 to generate a PUSCH.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, DL signals transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

Also, the measurement section 405 measures RRM and CSI according to commands from the control section 401. For example, the measurement section 405 measures CSI using measurement reference signals (the CRS, the CSI-RS, the CRS included in the DRS or the CSI-RS for CSI measurements arranged in DRS-transmitting subframes). The measurement results are output to the control section 401 and transmitted from the transmitting/receiving sections 103 using the PUSCH or the PUCCH.

<Hardware Structure>

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 20:
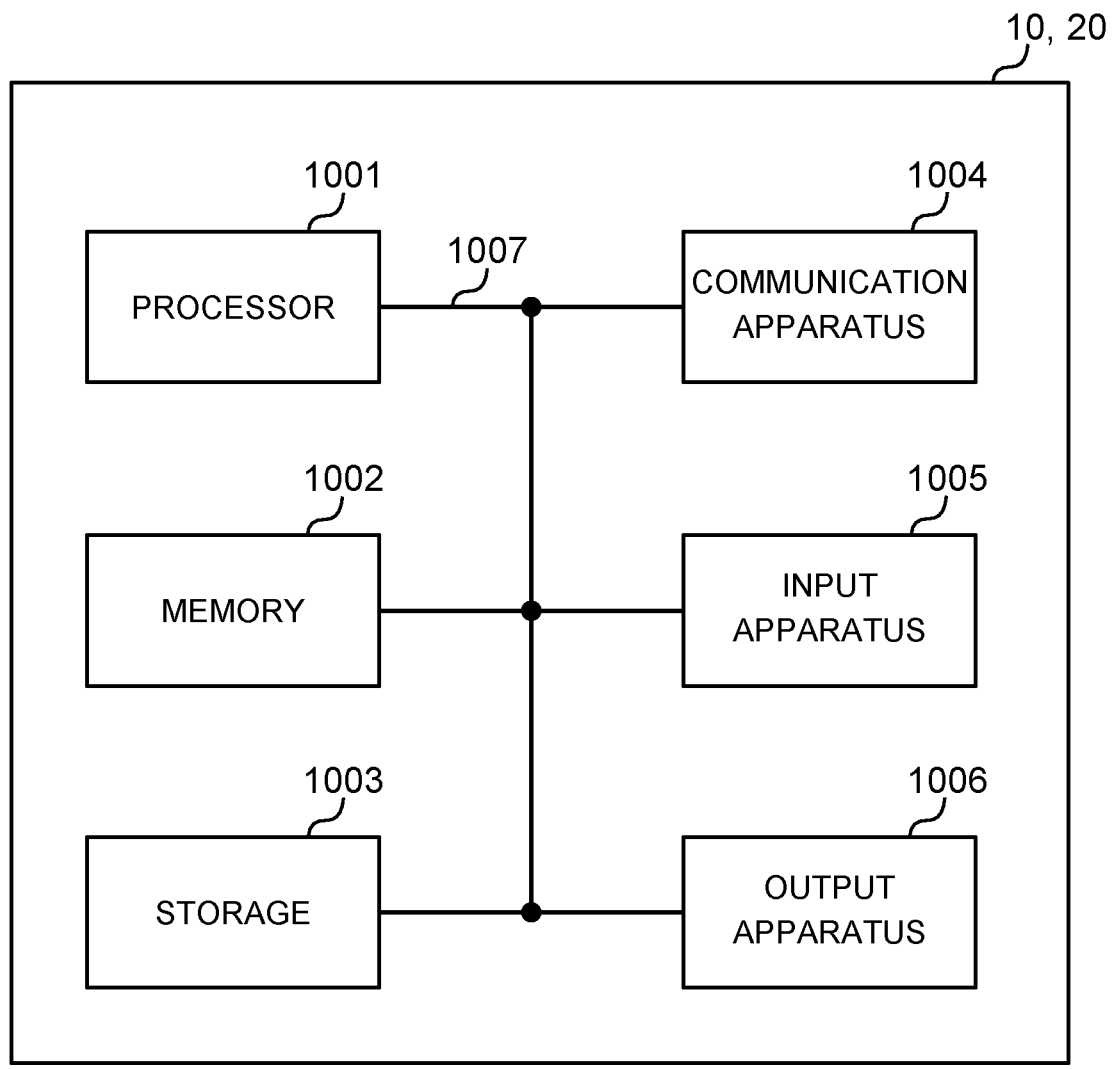
FIG. 20 is a diagram to show an example of a hardware structure of a radio base station and a user terminal according to the present embodiment.

That is, a radio base station, a user terminal and so on according to an embodiment of the present invention may function as a computer that executes the processes of the radio communication method of the present invention. FIG. 20 is a diagram to show an example of a hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001. Note that the processor 1001 may be implemented with one or more chips.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH, PDCCH, etc.) and information elements can be identified by any suitable name, the various names assigned to these various channels and information elements are not limiting in any way.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, predetermined information (for example, reporting of information to the effect that "X holds") does not necessarily have to be reported explicitly, and can be reported in an implicit manner (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GWs (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

As used herein the terms "determining" and "determining" encompass a wide variety of operations. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-078361, filed on Apr. 8, 2016, including the specification, drawings and abstract, is incorporated herein by reference in its entirety.

The invention claimed is:

1. A terminal comprising:
a receiver that receives downlink control information used for scheduling of an uplink shared channel; and
a processor that determines a transport block size (TBS) of the uplink shared channel based on both of an overhead and a target code rate,
wherein the overhead is for the uplink shared channel, and the target code rate is determined based on a modulation and coding scheme (MCS) index in the downlink control information, and
wherein the processor determines a number of symbols in a slot of the uplink shared channel, the number of symbols being used for determining the TBS of the uplink shared channel.

2. The terminal according to claim 1, wherein the overhead is determined based on at least one of a channel state information reference signal (CSI-RS), a downlink control channel, a broadcast channel and a synchronization signal mapped in each resource block allocated to the uplink shared channel.

3. The terminal according to claim 2, wherein the processor determines the TBS based on a demodulation reference signal (DM-RS) mapped in each resource block allocated to the uplink shared channel.

4. The terminal according to claim 2, wherein the processor selects the TBS from a plurality of TBSs.

5. The terminal according to claim 1, wherein the processor determines the TBS based on a demodulation reference signal (DM-RS) mapped in each resource block allocated to the uplink shared channel.

6. The terminal according to claim 5, wherein the processor selects the TBS from a plurality of TBSs.

7. The terminal according to claim 1, wherein the processor selects the TBS from a plurality of TBSs.

8. A base station comprising:
a transmitter that transmits downlink control information used for scheduling of an uplink shared channel; and
a processor that determines a transport block size (TBS) of the uplink shared channel based on both of an overhead and a target code rate,
wherein the overhead is for the uplink shared channel, and the target code rate is determined based on a modulation and coding scheme (MCS) index in the downlink control information, and
wherein the processor determines a number of symbols in a slot of the uplink shared channel, the number of symbols being used for determining the TBS of the uplink shared channel.

9. A radio communication method for a terminal, comprising:
receiving downlink control information used for scheduling of an uplink shared channel;
determining a number of symbols in a slot of the uplink shared channel, the number of symbols being used for determining a transport block size (TBS) of the uplink shared channel; and
determining the TBS of the uplink shared channel based on both of an overhead and a target code rate,
wherein the overhead is for the uplink shared channel, and the target code rate is determined based on a modulation and coding scheme (MCS) index in the downlink control information.

* * * * *